United States Patent [19]
Cato

[11] 3,819,057
[45] June 25, 1974

[54] LOADING STATION STRUCTURE FOR TRAY FORMING MACHINE

[75] Inventor: Carl P. Cato, Lynchburg, Va.

[73] Assignee: Dacam Corporation, Lynchburg, Va.

[22] Filed: Feb. 17, 1971

[21] Appl. No.: 116,277

Related U.S. Application Data

[62] Division of Ser. No. 815,474, April 11, 1969, Pat. No. 3,638,537.

[52] U.S. Cl................ 211/50, 214/8.5 D, 221/211, 221/312 A, 271/129, 271/149
[51] Int. Cl. ............................................. A47f 7/00
[58] Field of Search............ 211/50, 57; 221/312 R, 221/312 A, 39, 40, 41; 271/43 A, 61 R, 62 R, 62 B, 129, 145, 149; 193/38, 39, 40; 214/8.5 D

[56] References Cited
UNITED STATES PATENTS

| 2,642,285 | 6/1953 | Baker | 271/62 B |
|---|---|---|---|
| 2,693,957 | 11/1954 | Welsh | 271/62 B |

FOREIGN PATENTS OR APPLICATIONS

| 752,897 | 7/1956 | Great Britain | 271/62 R |

*Primary Examiner*—Albert J. Makay
*Assistant Examiner*—George F. Abraham

[57] ABSTRACT

A box-forming machine has a loading station at which a stack of blanks is stored, the blanks being provided with slots and the loading station structure including a rail which extends into those slots and supports the blanks in a substantially vertical orientation, with means being provided to retain the blanks in position but permit them to be moved one at a time from the loading station.

3 Claims, 22 Drawing Figures

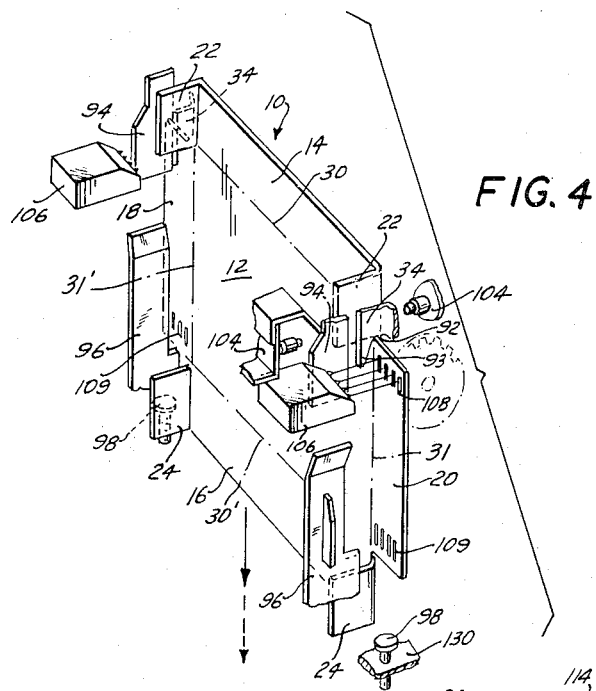
FIG. 4
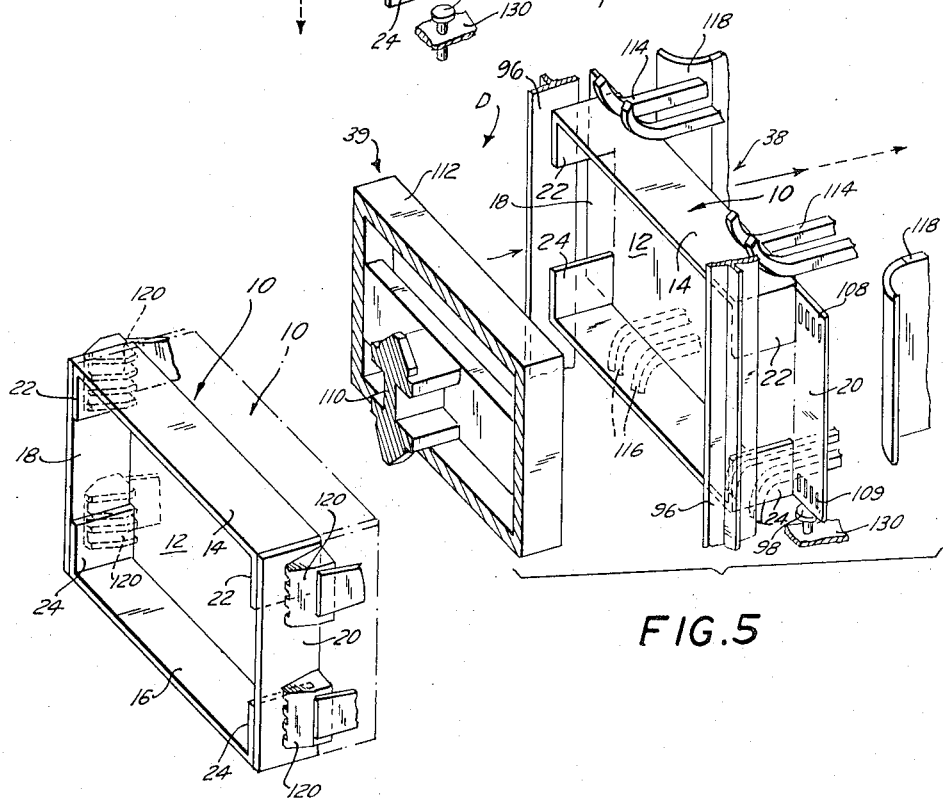
FIG. 5
FIG. 6

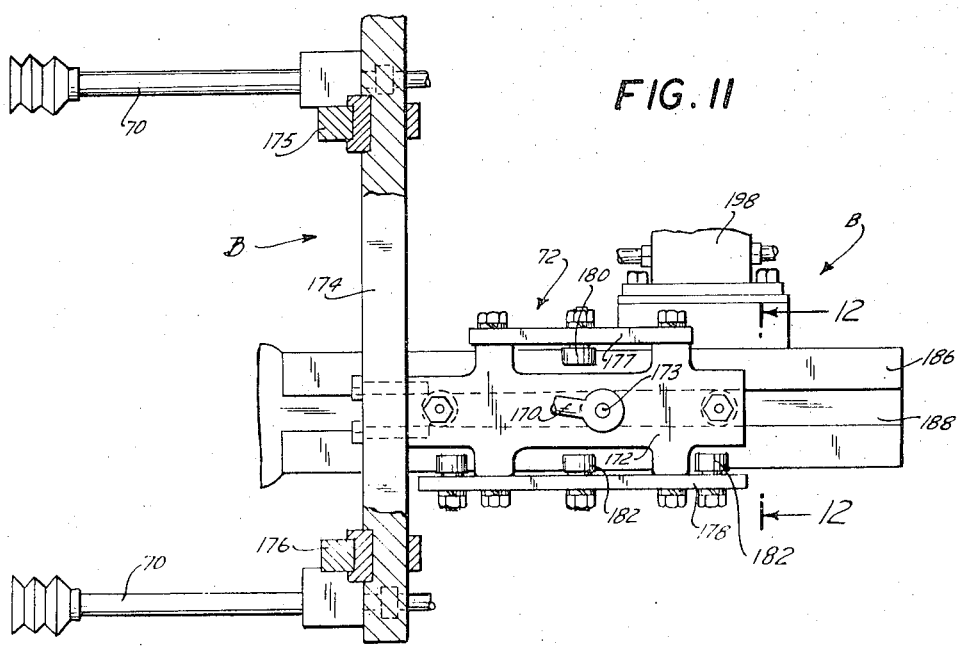
FIG. 11
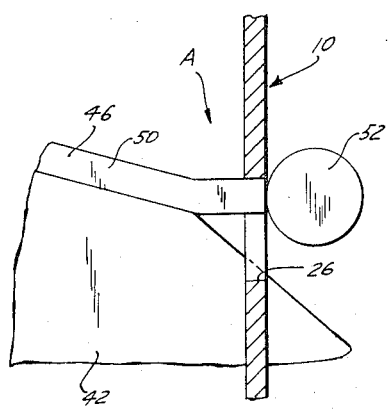
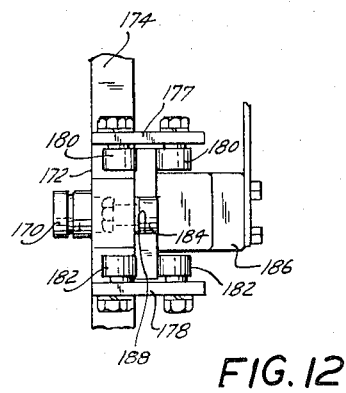
FIG. 12
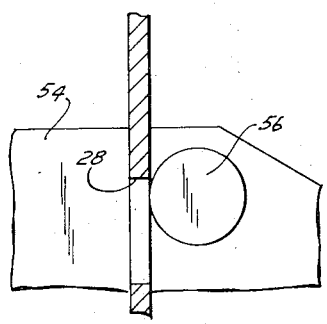
FIG. 13

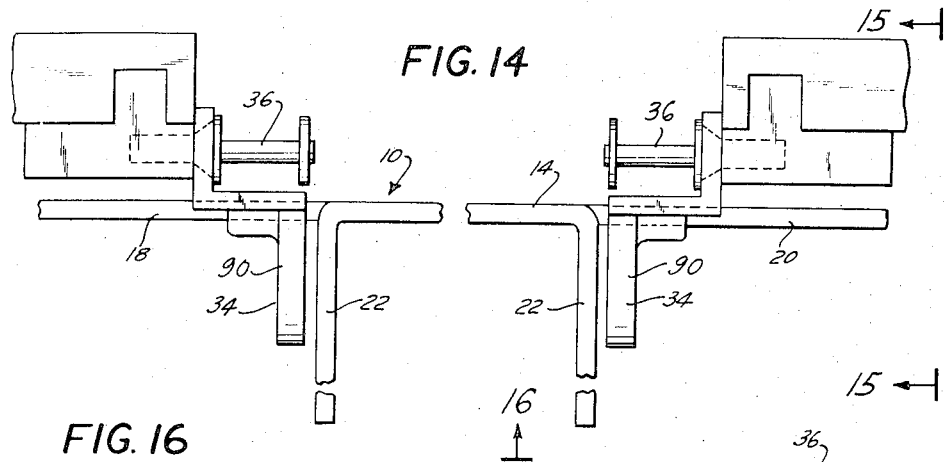
FIG. 14
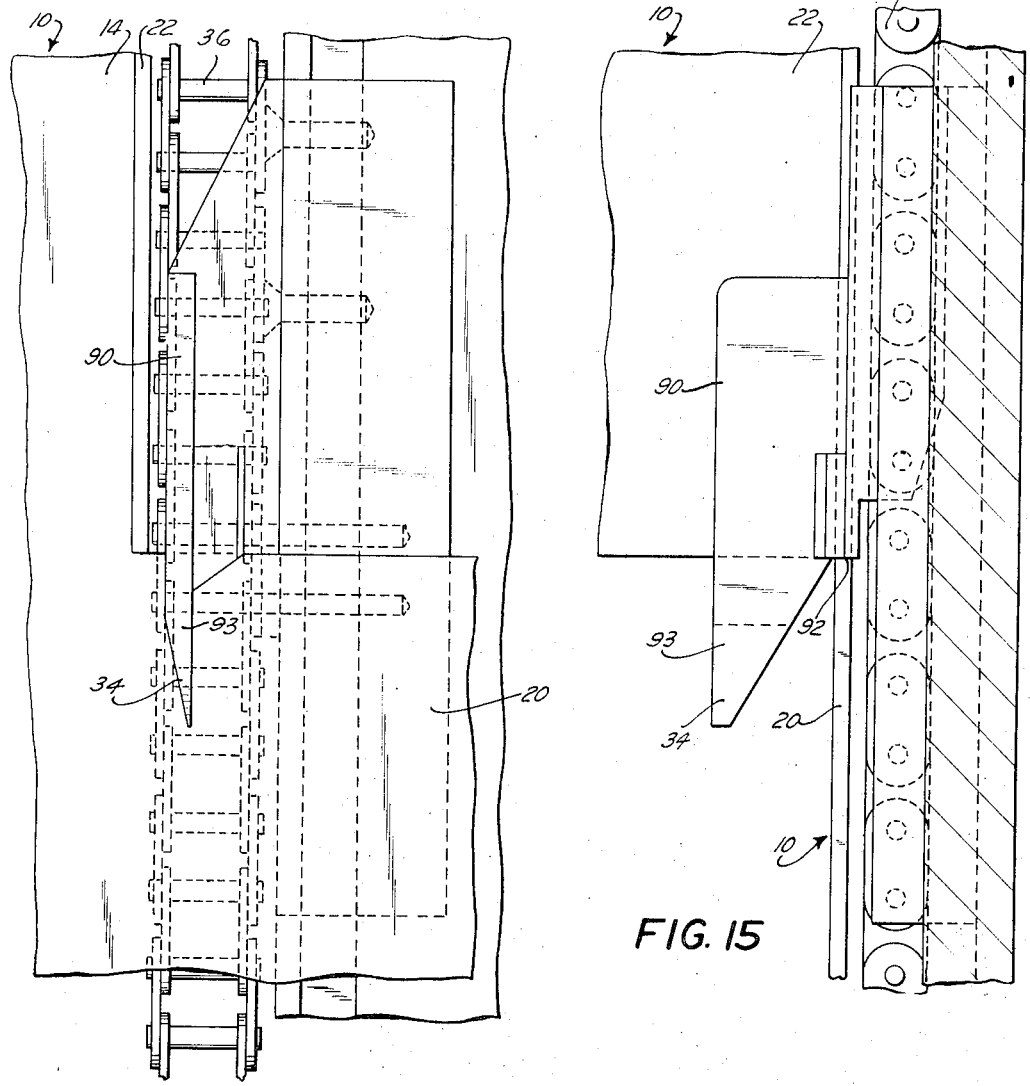
FIG. 16
FIG. 15

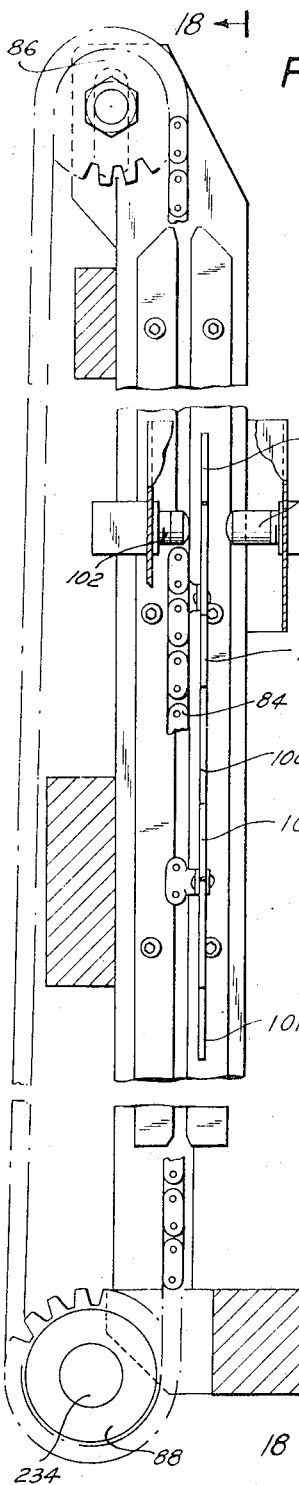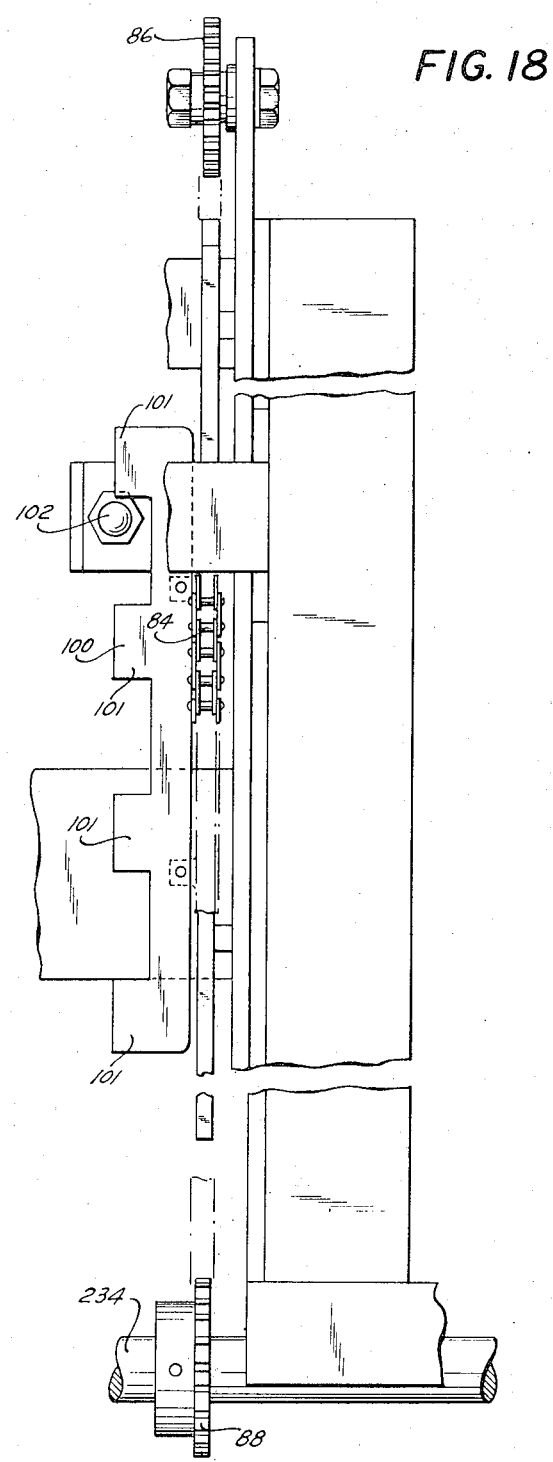

LOADING STATION STRUCTURE FOR TRAY FORMING MACHINE

This application is a division of application Ser. No. 815,474, filed Apr. 11, 1969, which has matured into U.S. Pat. No. 3,638,537.

The present invention relates to box forming machines, and particularly to a machine for forming set-up boxes or trays from prescored blanks.

Machines for forming set-up boxes or trays from prescored and often precut blanks are in common use to form the vast number of cartons, trays, boxes or the like used to package products. In these machines, blanks are placed at a loading station and are moved, as by a conveyor, to a forming die at which a ram inserts the blank into the die to fold the blank in a predetermined manner and to overlap certain of the folded panels and flaps in accord with the desired construction of the finished box. It is common practice to apply an adhesive at appropriate locations of the blank prior to the insertion of the blank into the die, so that the folding operation within the die is also effective to secure adjacent folded walls of the box to one another. Upon completion of the box forming step, a finished box is removed from the machine.

One of the major disadvantages involved in the operation of the known box forming machines is that they are comparatively slow in operation. This is largely a result of the wasted motion of the conveying and forming elements in the machine during the formation of the boxes. The ram, or its equivalent, which inserts the blank into the open end of the forming die must be returned to a position from which it can then be once again moved into engagement with the next blank at the entrance of the die. No useful operation is accomplished on the return movement of the plunger. In the great majority of these machines, the plunger moves vertically downward into the die and is then raised from the die to resume its position for a subsequent forming operation. The downward movement of the plunger into the die produces an excessive amount of noise and vibration which develops an unpleasant environment for the workers operating these machines, and may weaken the mechanical connections and upset the alignment and adjustments of the various components in the machine.

It is highly desirable for machines of this type to be readily adaptable for forming boxes of different sizes and shapes from blanks having correspondingly different sizes and shapes. Thus, the loading station and the box forming station, including the forming die, are preferably adjustable.

In spite of precautions taken during the initial formation and prescoring of the blanks, some blanks occasionally are miscut so that the slots formed in the blank will be improperly positioned along the edges of the blank. If the miscut blank is not detected at the loading station and removed therefrom, the blank will be passed to the forming section of the machine and an improper box will be formed. This will also occur if the blanks are of the improper size or if they are improperly oriented. The known box forming machines are generally not provided with means to automatically detect the presence of an improperly cut, dimensioned or oriented blank and therefore they either require close inspection of the blanks at the loading station or produce an impermissibly high number of rejects. The known machines also present difficulties with respect to the gluing operation in that the glue is frequently applied to the blank at locations other than those which subsequently overlap another folded part of the blank in the forming die, that excessive glue subsequently being exposed on the finished box, thereby detracting from the overall appearance of that box and tending to cause the contents inserted into the box to stick therein. Moreover, to insure the proper formation 66 the box in the forming die, the blank, and particularly the prefolded lines on the blank, should be in substantial registration with the entrance of the forming die when the blank is engaged and inserted into the die by the ram. If such registration is not achieved, the blank will be improperly folded and the resulting finished box will be sloppily formed and may require the rejection of the box, which is wasteful of both time and money.

It is, therefore, an object of the present invention to provide a box forming machine which operates with improved efficiency and at greater speeds of box production than was heretofore possible.

It is a further object of the present invention to provide a machine for forming boxes from prescored blanks, which operates with less vibration and noise than in the known machines of this type, and in which the boxes formed are consistently properly formed.

It is a further object of the present invention to provide a box forming machine in which the loading station is readily adjustable to accommodate blanks of different sizes and having differently spaced slots, and which facilitates the detection of improperly formed blanks thereat, thus avoiding the conveying of these blanks to the box forming die.

It is also an object of the present invention to provide a box forming machine in which the boxes are formed by the insertion of a blank by a ram into a forming die, in which an insertion of a blank into a die is effected during each direction of movement of the ram, thereby to increase the speed and efficiency at which the boxes are formed.

It is yet another object of the present invention to provide a box forming machine in which the blanks are reliably conveyed to the forming dies and are located in substantial registration with the entrance of the die at the time the blank is engaged and inserted into the die, thereby to insure consistently accurate formation of a box in the die.

It is still another object of the present invention to provide a machine for forming boxes from a plurality of prescored blanks in which the blanks are easily and reliably loaded into the machine, operation is possible with a minimum amount of supervision, and properly formed boxes are produced in an efficient, speedy, and economical manner.

To these ends, the present invention provides a machine for forming boxes from a plurality of prescored blanks, the machine comprising a pair of forming dies and a double ended ram. The ram is movable between positions in which it alternately engages a blank at the entrance of each of the forming dies, the withdrawing movement of the ram from one of the dies accomplishing an insertion movement of the ram, and with it a blank, into the other of the dies. A box is thus formed at each forming die for each direction of movement of the ram, thereby increasing the rate at which the boxes are formed.

The blanks are originally loaded in a substantially vertical stack at a loading station and are sequentially conveyed from the loading station along a first substantially horizontal path to a conveying station. During this movement, selected parts of the blank are engaged by a folding member interposed along that path of movement which prefolds these parts. The prefolded blank is engaged at the conveying station and conveyed to the entrance of the forming die by means which are also effective to maintain the prefolded parts of the blank in their folded condition as the blank is moved. The blank conveying means is preferably in the form of a lug carried by a reciprocating chain which comprises a first surface engaging the blank and acting as a blank moving surface, and a second surface engaging the prefolded parts of the blank and acting as a fold maintaining surface, the lug therefore being effective to accomplish both fold retaining and blank feeding. Further means are provided along the path between the conveying station and the forming die to maintain the prefolded parts of the blank in their folded condition as the blank moves towards the forming die. The lug moves the blank to the forming die in a manner which insures registration of the blank with the die entrance at the time of blank insertion into the die.

The loading station of the machine of the present invention comprises means for supporting the blanks in a substantially vertical orientation and comprises a rail which is adapted to be received in a slot formed along an edge of the blank. The rail carries an enlarged part adjacent to its end which is effective to engage the blank adjacent the slot, thereby to maintain the blank in its vertical position. The loading station may also comprise a second support member extending below the enlarged part and engaging the blank at a position adjacent a second, lower slot formed along the same edge of the blank. To accommodate blanks having different vertical spacing between these preformed slots, the spacing between the enlarged part and rail and the support member may be readily adjusted and set to conform to that spacing. The loading station may also comprise a loading plate upon which the lower edges of the blanks are initially placed, the relative vertical position of that plate being adjustable so that only those blanks having a predetermined vertical dimension between their lower edge and the upper slot (i.e., the slot receiving the rail) will be accommodated at the loading station. Defective blanks, such as those which are improperly dimensioned or oriented or which have slots either missing or improperly located will not be simultaneously supported by the rail in such a way as to be in proper relationship with the loading plate or the other blanks. As a result the defective blank will be readily detected and can be removed from the loading station so that jammed machine stoppage or a wasteful forming operation on that improper blank and the subsequent rejection of the box so formed are obviated.

A plurality of stripping fingers extend into the interior of each of the forming dies and are effective to engage a double thickness portion of the folded box formed in the die, that engagement being effective to prevent the return movement of the folded box. By engaging a double thickness portion of the finished box along its end walls rather than a single thickness portion along the side walls as was heretofore done, the stripping fingers do not interfere with the movement of the ram, and the formation of slots in the sides of the ram to enable the ram to pass over the stripping fingers is not required. The relative positions of the various folding members and the stripping fingers in the forming die can be adjusted and set to enable the die to form boxes from blanks having different dimensions and configurations, thereby to greatly increase the flexibility and economy of operation of the box forming machine.

To the accomplishment of the above, and to such other objects as may hereinafter appear, the present invention relates to the construction and manner of operation of a box forming machine, as defined in the accompanying claims and as described in the specification, taken together with the accompanying drawings in which:

FIG. 4 is a perspective view of the prefolded blank near the lowermost portion of its movement along the conveyor path to the forming die, illustrating the glue applicator and folding shoe provided along that path;

FIG. 5 is a perspective view, partly in section, illustrating the manner in which a ram inserts the blank into the mouth of the forming die;

FIG. 6 is a perspective view showing the folded box within the forming die and illustrating the internally provided stripping fingers engaging a double thickness portion of the folded box to prevent the removal of the folded box from the die upon the return movement of the ram;

FIG. 11 is an elevational view on an enlarged scale, of the sucker assembly used to move a blank from the loading station to the conveyor station;

FIG. 12 is a cross-sectional view taken along the line 12—12 of FIG. 11;

FIG. 13 is an enlarged fragmentary view in vertical cross-section illustrating the manner in which a blank is supported at the loading station of the machine of this invention;

FIG. 14 is a plan view, partly broken away, illustrating the manner in which a feed lug engages the prefolded blank as the blank is moved along the conveyor path to the forming die;

FIG. 15 is a view taken along the line 15—15 of FIG. 14;

FIG. 16 is a view taken along the line 16—16 of FIG. 14;

FIG. 17 is a cross-sectional view taken along the line 17—17 of FIG. 10;

FIG. 18 is a view taken along the line 18—18 of FIG. 17;

FIG. 21 is end view, partly broken away, of one side wall of the forming die of FIG. 19.

Figure 1:
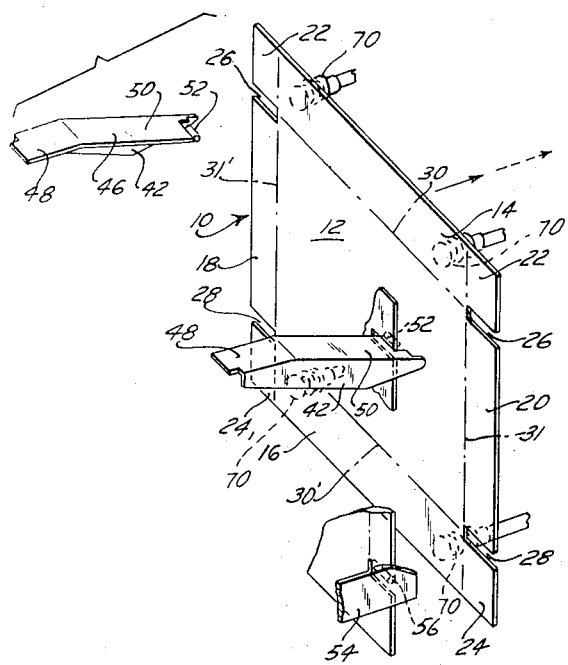
FIG. 1 is a perspective view illustrating a prescored blank being moved from the loading station to the conveying station in the box forming machine of the present invention.

The machine of the present invention forms trays or boxes from a plurality of prescored and precut blanks of the type shown in FIGS. 1–4. A typical blank of this type, generally designated 10, comprises a bottom panel 12, side panels 14 and 16, and end panels 18 and 20. Corner flaps 22, 22, and 24, 24 extend from side panels 14 and 16, respectively. To facilitate the forming and the loading of the blanks in the machine, slots 26 and 28 are formed along each vertical edge of the blank between the end panels 18 and 20 and the corner flaps 22 and 24. Blank 10 is preferably scored or precut along horizontal fold lines 30 and 30' and vertical fold lines 31 and 31' to define the lines along which the panels and flaps are to be folded in the formation of the finished box.

During that formation the corner flaps 22 and 24 are folded inwardly and the side panels 14 and 16 are then folded up followed by the folding of end panels 18 and 20 to overlap the previously folded corner flaps 22 and 24. The end panels 18, 20 and corner flaps 22, 24 may be glued to one another along their overlapping surfaces to secure the various parts of the blank in position to form the finished box as shown in FIG. 6.

Figure 8:
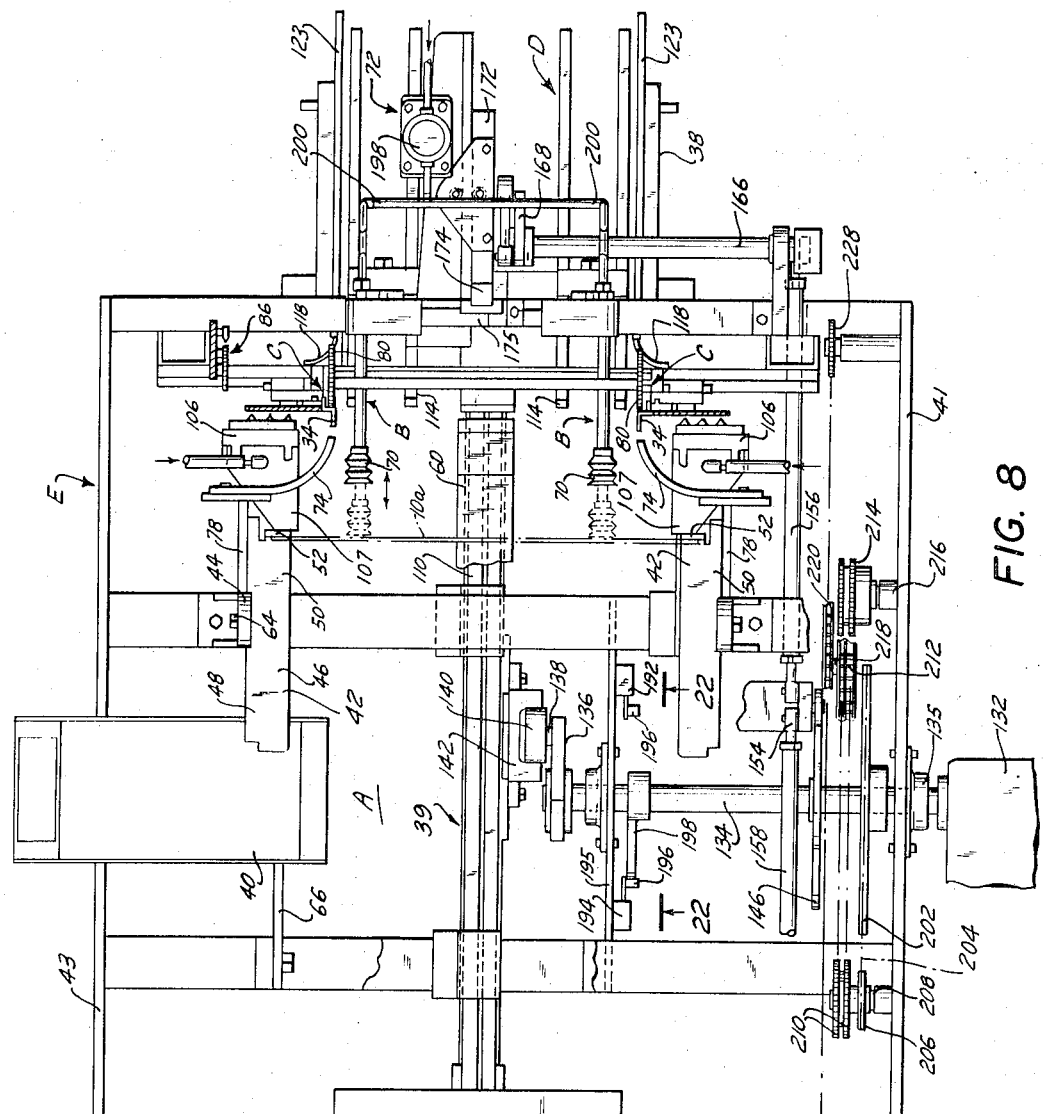
FIG. 8 is a top plan view of the box forming machine of this invention illustrating only one box forming section of the machine, the other box forming section being omitted for purposes of clarity.
Figure 9:
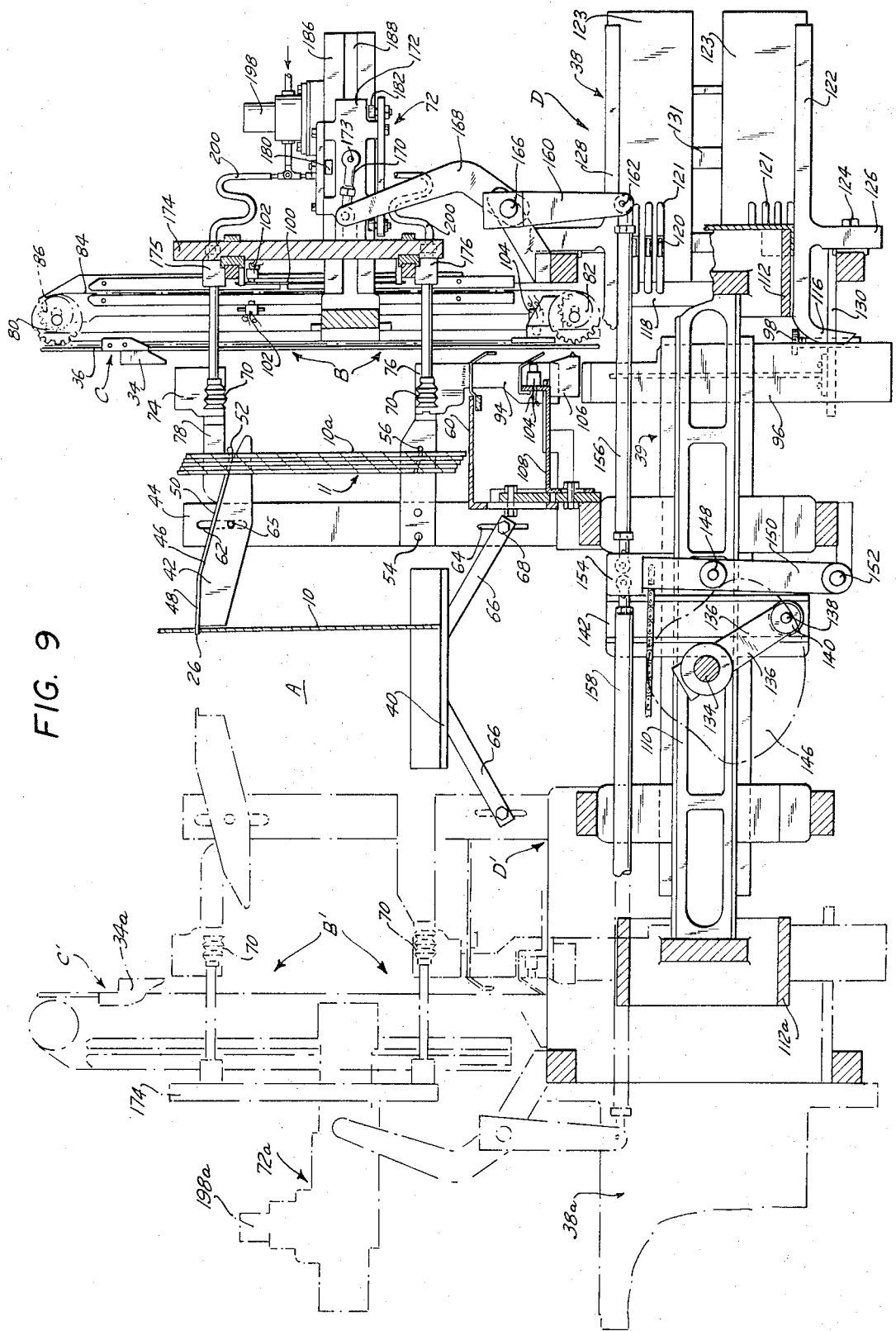
FIG. 9 is an elevational view, partly in cross-section, showing in the solid lines one of the box forming sections of the machine and schematically indicating by the broken lines, the other box forming section.
Figure 10:
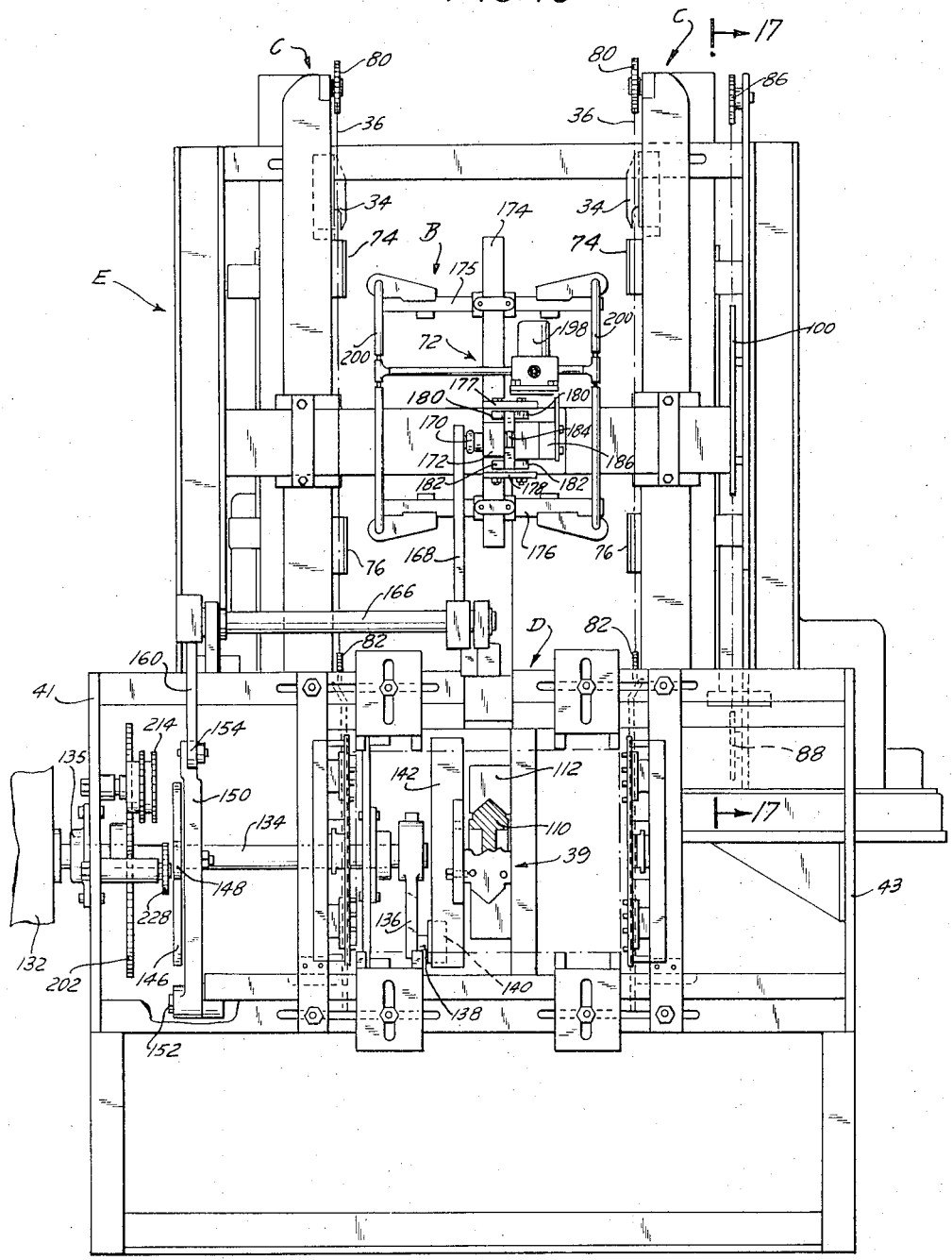
FIG. 10 is an end elevation view, partly in cross-section, of the box forming machine of FIGS. 8 and 9.

The stack of blanks to be processed to form the finished boxes are initially vertically arranged in a loading station generally designated A (FIG. 8). A leading blank from loading station A is moved by means of a sucker assembly generally designated B to a conveyor station generally designated C (FIG. 9). During movement of the blank from the loading station A to the conveyor station C, the upper and lower corner flaps 22, 24 are prefolded (FIG. 2) so that when the blank 10 reaches the conveyor station C (FIG. 3) the corner flaps 22, 24 are already in their folded condition. At conveyor station C, a pair of feed lugs 34 carried by conveyor chains 36 engage the prefolded blank and feed that blank towards a forming station generally designated D which includes a forming die 38. The positive feeding of the lug to the die 38 presents the blank in registration with the mouth of the die to insure proper box formation. A horizontally reciprocating double ended plunger or ram generally designated 39 engages the blank and pushes it into forming die 38. Die 38 comprises means for folding the side and end panels 14 − 20 of the blank along their respective fold lines to their final folded positions shown in FIG. 6. During the movement of the prefolded blank from conveyor station C to forming station D, flaps 22, 24 are maintained in their prefolded condition and a quantity of glue may be applied to end panels 18, 20 (FIG. 4) at the locations of these panels which subsequently overlap the flaps 22 and 24. The operating parts of the machine are mounted on a rigid frame generally designated E which comprises side frame members 41 and 43.

The folding box forming machine of the present invention may comprise two substantially identical forming sections located at each side of the machine. The first box forming section has already been generally described. The second box forming section comprises a second sucker assembly B', conveyor station C' and a box forming station D' comprising a forming die 38a, the latter being arranged on a common horizontal axis with forming die 38. Means are provided to alternately supply a prefolded blank at the opening of each of the forming dies 38 and 38a in synchronism with the movement of the double ended plunger 39 which alternately engages a blank at one forming die while it withdraws (after having completed a box forming operation) from the other forming die.

Means are provided to reciprocate the ram 39 between its two operative positions, that is, the positions at which it forces a blank into first one and then the other of the forming dies respectively, and to operate sucker assemblies B and B' and the conveyor in synchronism therewith, so that a blank is positioned at one forming die at the time the plunger 39 is inserted into that forming die. As the sucker assemblies and the conveyor and box forming stations in each box forming section are substantially identical in construction and manner of operation, only one of these will be described with particularity herein, it being understood that such description applies equally to the components of both sections.

BLANK LOADING

The blanks 10 are initially loaded at loading station A on a loading plate 40 (FIGS. 8 and 9), the lower edges of the blanks resting on plate 40. A bracket 42, secured to a vertical support member 44, comprises a rail 46 having a horizontal part 48 and a downwardly sloping part 50. An enlarged part 52 is provided at the end of the sloping part 50. A lower transverse bracket 54 is secured to vertical support 44 and has a pin 56 extending therefrom, substantially directly beneath and parallel to the enlarged part 52. The vertical distance between the reference plane defined by the upper surface of plate 40 and the horizontal rail portion 48 is adjustable and corresponds to the distance between the lower edge of the blank 10 and the location of its upper slot 26. If the blank 10 is of the proper vertical dimension and slot 26 is properly formed, the slot 26 will register with rail 46 and part 48 will be received within slot 26 and will be effective to support the blank 10 in a substantially vertical position on plate 40 as shown in FIG. 9. If for some reason, the blank 10 is of an improper size or if slot 26 is either not cut, or is cut in an improper position along the edge of the blank, or if the blank is not properly oriented, the slot 26 will not register with the rail 46 when the blank 10 rests on support plate 40 so that the improperly dimensioned or miscut blank will not be supported by rail 46 at loading station A and will thus be readily detected and reoriented or removed.

A properly dimensioned and cut blank is then moved over the horizontal part 48 of rail 46 until it reaches the onset of sloping part 50. The blank then proceeds to slide along rail 46 until it abuts against the enlarged part 52 at a position above slot 26, its lower portion then resting against the pin 56, which engages the blank adjacent its slot 28 (FIG. 13). At this time, the lower edge of the leading blank 10 may rest on or be spaced above the upper surface of brake bracket 60, and will be supported in a substantially vertical position by the engagement of the enlarged part 52 and pin 56 with the blank adjacent the upper and lower slots 26 and 28. A plurality of blanks are so loaded and form a stack of blanks near sucker assembly B as at 11. The upper slot 26 of each blank receives the sloping part 50 of rail 46; only the leading blank 10a engages enlarged part 52 and pin 56. A second stack of blanks (not shown) is formed in a similar manner near the other sucker assembly B'.

To accommodate blanks of different sizes and different spacing between the upper and lower slots 26 and 28, the relative vertical positions of loading plate 40 and rail 46 (and thus enlarged part 52) are adjustable. To this end, slots 62 and 64 are formed in vertical support 44, bracket 42 being secured to vertical support 44 by a fastener 64 which passes through slot 62 and strut 66, secured at one end to the support plate 40, is secured at its other end to vertical support member 44 by means of a fastener 68 passing through slot 64. Thus the vertical distance between the support plate 40 and the rail part 48 and the enlarged part 52 may be set to accommodate the particular sized and cut blanks loaded at loading station A. The adjustment of the position of bracket 42 also determines the distance between enlarged part 52 and pin 56 so that blanks having varying distances between the slots 26 and 28 may be supported by part 52 and pin 56 at stack 11. As seen in FIG. 8, a pair of such brackets 42 each having a rail 46 and an enlarged part 52 are arranged at the front and rear of the machine to receive the slots 26, 28 in the end panels 18 and 20. A second lower pin 56 is also provided below the second enlarged part 52 but cannot be seen in FIG. 8.

The vertical position of brake bracket 60 may be adjusted to correspond to the distance between the lower slot 28 and the lower edge of the blank, i.e., the height of corner flap 24.

INITIAL BLANK MOVEMENT AND PREFOLDING

Figure 2:
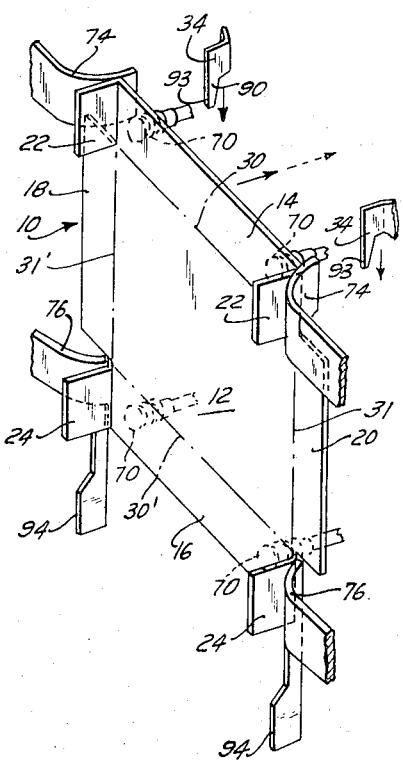
FIG. 2 is a perspective view illustrating the blank as it is moved past prefolding plates positioned in the path between the loading station and the conveying station.

The leading blank 10a in stack 11 is moved to the conveyor station C by means of the sucker assembly B. Sucker assembly B comprises four sucker rods 70 which are moved in unison into and out of engagement with the leading blank by the operation of a sucker operating mechanism generally designated 72, the operation of which is more completely described below. When the sucker arms 70 are moved into position to engage leading blank 10a as shown in FIG. 2 and by the broken lines in FIG. 8, a vacuum is created at the ends of the sucker arms 70 to create a suction force enabling the sucker arms to securely grasp the leading blank 10a. When the sucker arms 70 are then moved back (to the right in FIGS. 8 and 9) towards their original position, the leading blank 10a is pulled over the restraining enlarged part 52 and pin 56 and is moved towards conveyor station C. When the sucker arms 70 reach the furthermost position away from the stack 11 and the blank 10a is positioned at the conveyor station C, the vacuum pressure, and thus the suction force between the sucker arms 70 and the blank 10a, is removed.

Two pairs of opposing arcuate bending plates 74, 74 and 76, 76 are positioned in the path of movement of leading blank 10a from the stack 11 to the conveyor station C. When the blank is moved by the sucker arms 70 past bending plates 74 and 76, the plates respectively engage the upper and lower corner flaps 22 and 24 to fold these flaps along their foldlines 31 and 31'. At the time the blank reaches the conveyor station C, all four of the corner flaps 22 and 24 are in folded condition (FIG. 2).

The upper folding plates 74 are secured to brackets 78 which are in turn secured to brackets 42 so that the adjustment of the vertical position of the latter, which as described above adjusts the loading station A to receive blanks of different vertical dimensions, also effects adjustment of the vertical position of the upper folding plates 74. Hence the plates 74 are substantially at the level of the upper corner flaps 22 as the blank passes thereby on its way to the conveyor station C. The lower folding plates 76 are secured to bracket 54 which carries the pin 56 so that the vertical distance between the upper and lower folding plates 74, 76 is correlated to the vertical distance between the enlarged part 52 and the pin 56 and thus to the spacing between the upper and lower corner flaps of the blank.

BLANK CONVEYING

The conveyor station C, which receives the blank in its prefolded condition, comprises a pair of spaced vertically reciprocating chains 36 passing around upper and lower sprocket wheels 80 and 82, each chain 36 carrying a feed lug 34, and a third vertically reciprocating chain 84 passing around upper and lower sprocket wheels 86 and 88 and carrying a template 100. The vertical motion of the chains 36 and 84 is synchronized with the horizontal movement of sucker assembly B to position the feed lugs 34 directly above the upper edges of end panels 18 and 20 of the blank at the time the blank has been moved to its maximum extent away from the stack 11 by means of the sucker arms 70, at which time, it will be recalled, the suction force between the blank and sucker arms 70 is removed.

Figure 3:
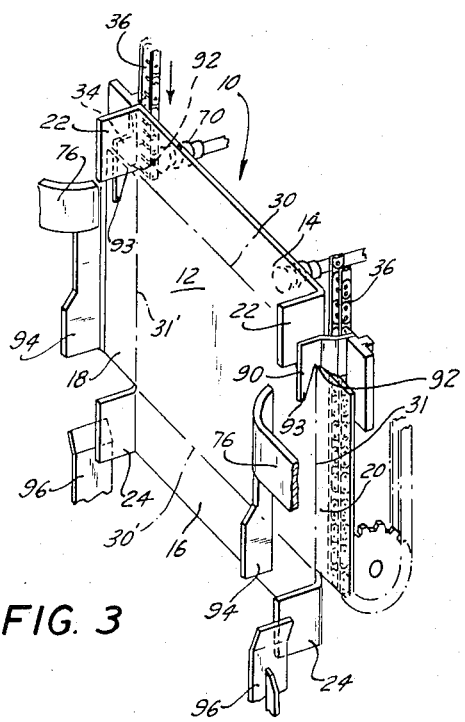
FIG. 3 is a perspective view illustrating the prefolded flap engaged by a feed lug after it has been moved by that lug to a position below that shown in FIG. 2.

As seen in FIG. 3 and FIGS. 14–16, lugs 34 are in the form of a vertical flat part 90 which partially engages or abuts against the prefolded corner flap 22, and a horizontal edge part 92 which abuts against the upper edge of one of the end panels 18 and 20. A tapered finger segment 93, contiguous with surface 90, extends over the end panels 18 and 20 to restrain the blank in a vertical position. As the chains 36 are moved downwardly, the engagement of the lug edge parts 92 with the upper edges of panels 18 and 20 urge the blank downward, and the engagement of the larger vertical parts 90 against the prefolded corner flaps 22 and 24 maintain those flaps in their folded position (FIGS. 3).

Lower folding plates 76 each have a fold retaining bracket 94 depending therefrom. A pair of fold retaining shoes 96 is positioned along the path of movement of the prefolded blank below the lower end of brackets 94. As the blank is urged downward by the feed lugs 34 the upper corner flaps 22 pass by the upper folding plates 74 and approach the upper end of lower folding plates 76, and the folded lower corner flaps 24 pass by brackets 94 and are engaged by shoes 96. As the blank moves further along its downward path the upper corner flaps 22 are engaged by the lower end of bracket 94 and the lower flaps 24 continue to be engaged by shoes 96 (FIG. 4). As the blank urged by lugs 34 moves still further downward, both upper and lower flaps 22 and 24 engage the shoes 96 until the blank reaches its lowermost point along the conveyor path, at which time the blank is positioned directly in front of and in registration with the mouth of orming die 38 (FIG. 5). An adjustable stop 98 is positioned near the entrance of the forming die 38 and engages the lower edge of end panels 18 and 20 to prevent further downward movement of the blank. The frictional engagement between the brackets 60 and 94 and the shoes 96 on the one hand and the prefolded corner flaps 22 and 24 on the other hand is effective to limit the rate at which the blank moves towards the forming die and prevents the blank from freely falling after the suction force of the sucker arms 70 is released therefrom.

It will be noted in FIG. 3, that the edge parts 92 of the lugs 34 engage end panels 18 and 20 along edges that are colinear with the upper foldline 30 along which the upper side panel 14 is to be folded at forming die 38. As the extent of travel of chains 36 and lugs 34 can be accurately controlled, the positive blank feed by lugs 34 to the forming die 38 insures that the foldline 30 will be positioned in substantial registration with the mouth of that die, thus in turn insuring that the side panel 14 of the blank will be accurately folded along foldline 30. The lower side panel foldine 30' necessarily will be in registration with its folding member in forming die 38 when the upper foldline 30 is so positioned, so that side panel 16 will be similarly accurately folded along its foldline 30'.

While the blank is moving from the conveyor station C towards the entrance of the forming station D, a controlled quantity of glue is applied at specified locations along end panels 18 and 20, so that when these panels are folded over the corner flaps 22 and 24 in forming die 38, the glue will set and secure these parts to one another, thereby to secure the box in its desired condition. For this purpose, template 100 is carried on the outer flight of chain 84 which reciprocates in synchronism with chains 36. The lugs 34 are on the inner flight of chains 36, so that as the lugs 34 move downward template 100 will move upwards, and vice versa. A first photocell assembly 102 is arranged in the upper part of the path of movement of the template 100, and a second photocell assembly 104 is arranged at the lower part of the path of movement of lugs 34 and the blank towards the forming station D (see FIG. 9). The photocell assemblies 102 and 104 are in operative connection with an amplifier and solenoid control switch (not shown) and are effective when the light beams of both pairs of photocell assemblies are interrupted to trigger that switch to operate a pair of glue sprayers 106 arranged along the path of the blank's movement in alignment with the end panels 18 and 20. The glue sprayers 106 are mounted on horizontally adjustable brackets 107 and the lower photocell assembly 104 is mounted on a bracket 108 the vertical position of which is adjustable to enable glue sprayers 106 to be accurately positioned to supply a controlled amount of glue at the appropriate locations on blanks of varying dimensions. As seen best in FIG. 9, the upper photocell assembly 102 is displaced to the right of the lower photocell assembly 104. The reciprocating movement of chains 36 and 84, which respectively guide the blank towards the forming station D and carry the template 100, will cause the blank to interrupt the light beam of the lower photocell assembly 104, and the template 100, during its motion, which, as noted above, is opposite in direction to that of feed lugs 34, will interrupt the light beam of the upper photocell assembly 102. As seen in FIG. 18, template 100 comprises a series of spaced teeth 101 so that when chain 84 moves template 100 through photocell assembly 102 its light beam is periodically interrupted by the teeth 101. As a result, glue sprayer 106 will be actuated once for each of the teeth 101 of template 100 during the downward motion of the blank towards the forming station D, thereby to deposit globules of glue along end panels 18 and 20 as shown at 108 and 109 in FIG. 4.

During the upward motion of chains 36 to return feed lugs 34 to a position to engage the next blank from the stack, no blank is carried by chains 36. As a result, even though the teeth 101 of template 100 (now moving downward) once again interrupt the beam of light of upper photocell assembly 102, that interruption will not be effective to operate the glue sprayers 106, since the light beam through the lower photocell assembly 104 remains uninterrupted (there is no blank to do the interrupting). Glue sprayers 106 will thus only be operated when a blank is carried down by the conveyor chains 36 and feed lugs 34 towards the forming station D.

To summarize, the prefolded blank from loading station A is conveyed downwardly from the conveyor station C to the blank forming station D while the upper and lower corner flaps 22 and 24 are folded, these flaps being at all times maintained in their folded condition while the blank is so conveyed. During the movement of the prefolded blank, a controlled quantity of glue is deposited at selected locations along the end flaps 18 and 20 of the blank. The foldlines 30 and 30' along which the side flaps 14 and 16 are to be respectively folded are aligned with the forming elements in the die as a result of the positive feed of the blank by the feed lugs 34 along an edge which is colinear with the upper foldline 30, and by the adjustable positive stops 98. When the blank is in front of the mouth of the forming die 38, the prefolded corner flaps 22 and 24 are maintained in their folded condition by their engagement with the lower part of the folding shoes 96.

BOX FORMATION

A prefolded and glued blank is inserted into the mouth of the forming die 38 by the operation of ram 39 which comprises a plunger 110 carrying a forming head 112 and 112a on each of its ends (FIG. 9). When head 112 engages and inserts a blank into forming die 38, head 112a is withdrawn from forming die 38a (shown in broken lines in FIG. 9), and when forming head 112 is withdrawn from forming die 38, forming head 112a is moved into forming die 38a to engage and insert a blank and form a box thereat. Forming dies 38 and 38a are substantially similar in construction and are arranged along a common horizontal axis which also defines the axis of reciprocatory motion of plunger 110, the latter thus being effective to alternately insert and withdraw forming heads 112 and 112a into forming dies 38 and 38a respectively. Only forming die 38 will be described herein, it being understood that this description applies equally to forming die 38a.

Figure 19:
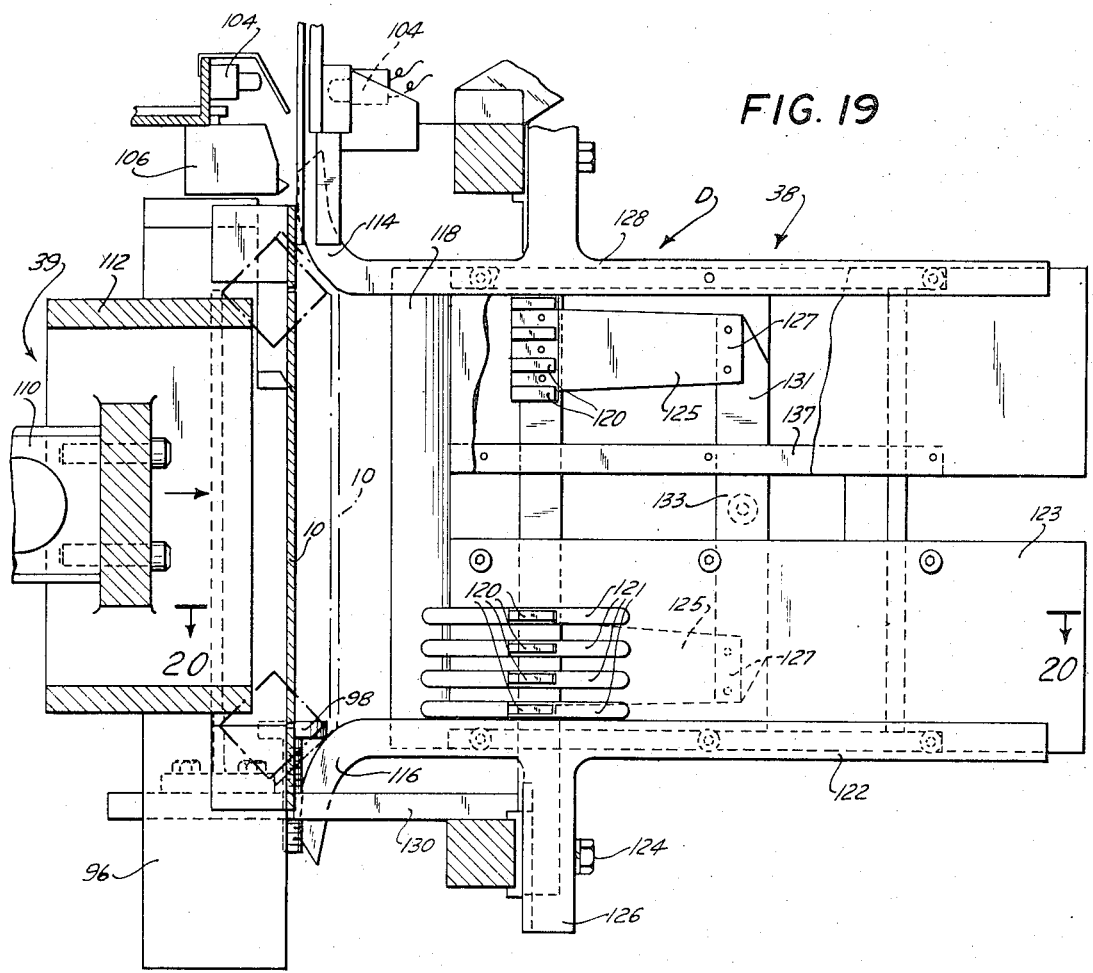
FIG. 19 is a partly broken away vertical cross-section taken through one of the forming dies and illustrating a blank positioned at the mouth of the die about to be engaged and inserted into the die by the ram.
Figure 20:
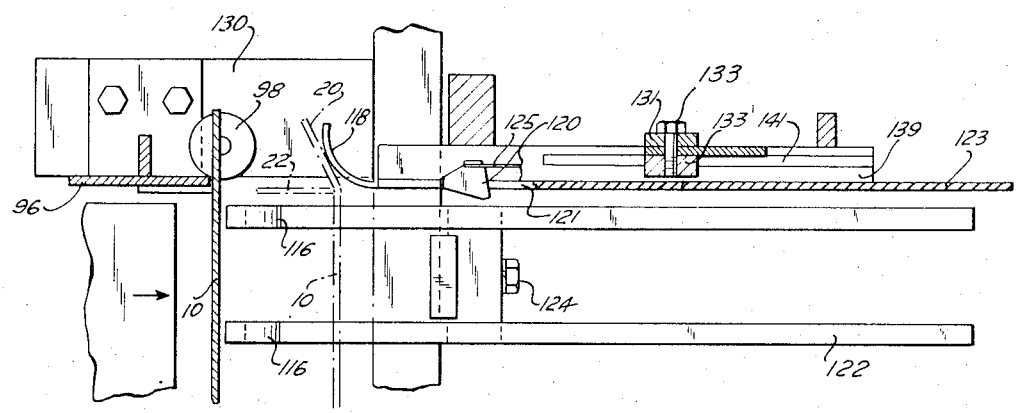
FIG. 20 is a cross-sectional view taken along the line 20—20 of FIG. 19.

As seen best in FIGS. 5, 9 and 19, the forming die 38 comprises a pair of sets of folding fingers 114 and 116 which respectively engage and fold side panels 14 and 16 as the blank is moved into the die by the ram 39. Located outboard of fingers 114 and 116 (in the axial direction of movement of ram 39) are the end panel folding plates 118 which, as the blank is inserted further into the die, engage and fold the end panels 18 and 20 as the blank passes thereby. The end panels 18 and 20, which carry the glued portions 108 and 109, are folded over the folded corner flaps 22 and 24 and are adhered thereto. The overlapping of the end panels 18 and 20 and the corner flaps 22 and 24 form a double-edged thickness of the box (FIG. 6) as distinguished from the single edge thickness of the remainder of the finished box. Outboard of folding plates 118, two sets of strippers 120 project into the interior of die 38. They are provided with radially inwardly and axially outwardly inclined camming surfaces which permit the folded box to pass thereover towards the exit of the forming die 38, the strippers 120 then engaging the double thickness portion of the folded box after the folded box has passed thereover, thereby to prevent the reverse movement of the finished box back towards the entrance of the forming die when the ram 39 is moved out of the die. These strippers 120 thus are effective to remove the finished box from the forming head 112. Strippers 120 engage the folded blank only along the double edge thickness portion of the box (i.e., where end panels 18 and 20 overlap corner flaps 22, 24), but need extend into the interior of the forming die 38 only substantially to the extent of the thickness of a single edge. As a result, the forming head 112 is able to move freely past the strippers 120 without having to provide slots in the side walls of the head 112.

A given finished box remains in the interior of the forming die 38 outboard of the strippers 120. The formation of the next box in that forming die is effective to move the previously formed box outward towards the exit of the forming die 38 from which the box falls or is subsequently removed. While the finished box is in the forming die 38, the panels 18, 20 are pressed against the corner flaps 22, 24, so that the glue on the side panels 18 and 20 has the opportunity to set. Hence, when a given box is removed from the forming die it is ready for shipment and packing.

The vertical position of the lower wall 122 of the forming die 38, along with the folding member 116 carried thereby, may be varied by loosening a fastener 124 passing through a vertical slot provided in support 126 (FIG. 19). Wall 128 may be also either raised or lowered to vary the relative vertical position of the upper forming member 114 in a similar manner. The blank stop 98 is a threaded member passing through an opening in plate 130. The strippers 120, in two sets of four strippers each, extend into the interior of die 38 through a series of parallel slots 121 formed in a pair of end walls 123 from which folding members 118 extend. Each set of strippers 120 is secured to a spring 125 (FIG. 21) clamped between element 127 and spacer 129, the spacer 129 in turn being mounted on a vertical bracket 131. An adjustment screw 133 passes through an opening in bracket 131 and engages a nut 133' having an annular flange 135 extending into longitudinal channels 141 formed in a pair of rails 137 and 139 extending longitudinally along die 38. When nut 133' is loosened, bracket 131 may be moved along channels 141, thereby to move strippers 120 along slots 121 to a desired position corresponding to the depth of the finished box, after which nut 133' is tightened to maintain bracket 131 and strippers 120 in that position. In this manner the strippers 120 may be accurately positioned within die 38 to remove finished boxes of varying depths from the withdrawing ram 39.

The side walls of the forming die which carry the folding members 118 and the strippers 120 are also mounted so as to be adjustable to accommodate blanks of varying widths, and particularly blanks having different transverse dimensions between their end panel foldlines 31 and 31'. The folding and stripping elements of forming dies 38 and 38a can thus be readily adjusted and set for box forming operations on a great variety of blank types, to form finished boxes of differing sizes and shapes. The overall flexibility of the machine thus is greatly increased without the need for replacing the forming die for different boxes, and hence without a significant increase in the complexity and cost of the machine.

RAM MOVEMENT

As described above, ram 39, which alternately inserts the blanks in the forming dies 38 and 38a, is driven in synchronism with the blank moving mechanism so that when a blank is presented at the mouth of a forming die, the ram is moving in a direction to insert the blank into that die.

The driving energy for the various mechanisms of the machine is provided by an electric motor 131 (see FIG. 7) which is operably connected to a gear or drive box 132 having an output shaft 134, journalled in a bearing 135 mounted on end wall 41. Shaft 134 carries a crank 136 (see FIGS. 8 and 9) which has a pin 138 secured to its free end which in turn carries a roller 140. Roller 140 is free to move vertically along a scotch yoke 142 which is secured to the transverse plunger 110 of the ram 39. Thus, as shaft 134 rotates, roller 140 moves along a circular path and acts against the scotch yoke 142 to impart transverse motion to plunger 110 first in one direction, as it rotates between its two extreme horizontal positions in one direction (e.g., from left to right), and then in a reverse transverse direction, as the roller moves between its extreme horizontal positions in the opposite direction (e.g., from right to left). Reciprocating motion is imparted to plunger 110 and to ram 39 to cause one head, e.g., 112, of the ram 39 to first enter forming die 38, and then as that head leaves forming die 38, the other head 112a is inserted into the other forming die 38a.

Shaft 134 also carries a cam 146 which rotates therewith. A cam follower 148, carried on a rocker arm 150, which is pivotally mounted at its lower end on a pin 152, engages cam 146 and is springloaded thereagainst by a suitable biasing spring (not shown). Arm 150 at its upper arm is secured at a joint 154 to the ends of two transverse rods 156 and 158 which are operatively connected respectively to the sucker arm operating mechanisms 72 and 72a provided at each end of the machine to produce the alternating reciprocating motion of the sucker arms 70. As the manner in which rods 156 or 158 are connected to their respective sucker operating mechanisms is identical, only one such connection will be described herein (i.e., the mechanism 72 operatively connected to rod 156). A crank 160 is pivotally connected to one end of rod 156 by pin 162 and its other end is fast on shaft 166, which is in turn fast to crank 168, crank 168 being connected at its upper end to an arm 170 which in turn is pivotally connected to a sucker carriage 172 by pin 173.

As seen best in FIGS. 11 and 12, sucker carriage 172 carries a supporting post 174 which carries transverse arms 175 and 176 which in turn carry sucker arms 70 at their ends. Carriage 172 also includes upper and lower brackets 177 and 178 to which rollers 180 and 182 are respectively rotatably mounted. Two additional rollers 184, rotatable about an axis perpendicular to the axes of rotation of rollers 180 and 182, are mounted centrally along the carriage 172. The roller 182 is received in and moves along a longitudinal channel 188 formed in guide rail 186. As shown in FIG. 12, rollers 180 and 182 engage opposing surfaces of the rail 186 and allow carriage 172 to move therealong when an appropriately directed force is applied to arm 170.

The rotation of shaft 134 causes cam 146 to rotate, thus causing arm 150 to pivot about pin 152, thereby causing reciprocatory motion of rod 156. Crank 160 is then pivoted about pin 162 to impart a rocking motion to shaft 166 which in turn causes crank 168 to pivot. That movement of crank 168 applies a transverse force to arm 170 which causes carriage 172 to move along rail channel 188. As a result sucker post 174 and sucker arms 70 will move in a direction either to or from the stack of blanks depending on the direction of movement of rod 156, which in turn is determined by which portion of cam 134 is engaging the cam follower 148 at that time. It will be seen that rods 156 and 158 reciprocate in the same direction so that as the carriage 172 of sucker assembly B is moving outwards, that is away from the stack to pull a blank from the stack to the conveyor station C, the other sucker assembly B' operatively connected to rod 158 is moved from the conveyor station C' towards the other stack of blanks on its way to remove a blank therefrom.

Figure 22:
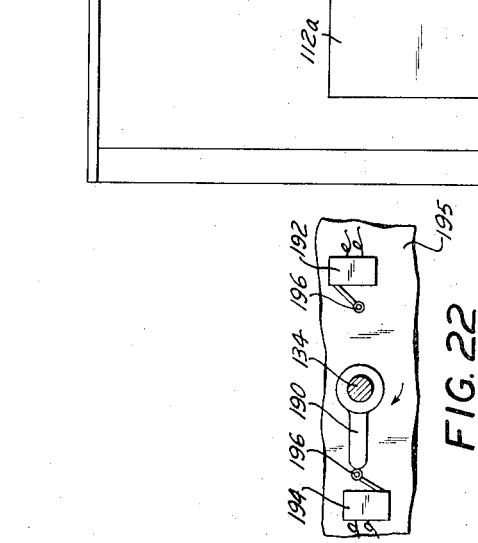
FIG. 22 is a view taken along the line 22—22 of FIG. 8.

As seen best in FIG. 22 an outwardly extending arm 190 is secured to shaft 134 and a pair of switches 192 and 194 are transversely spaced along a support plate 195 in the path of movement of arm 190 as it rotates along with the shaft 134. Switches 192 and 194 are periodically actuated when the end of crank 190 engages the pivoting contact members 196 of each switch. Switches 192 and 194 are in respective circuit connection with solenoids 198 provided in each of sucker assemblies B and B'. As shaft 134 rotates, these solenoids are alternately energized through actuation of switches 192 and 194, to connect their associated sucker arms 70 with a source of vacuum, operatively connected thereto via tubes 200. The timing is such that each sucker assembly B and B' is vacuumized only from its time of engagement with the leading blank 10a at loading station A to the time that it has moved that blank to the conveying station C.

Figure 7:
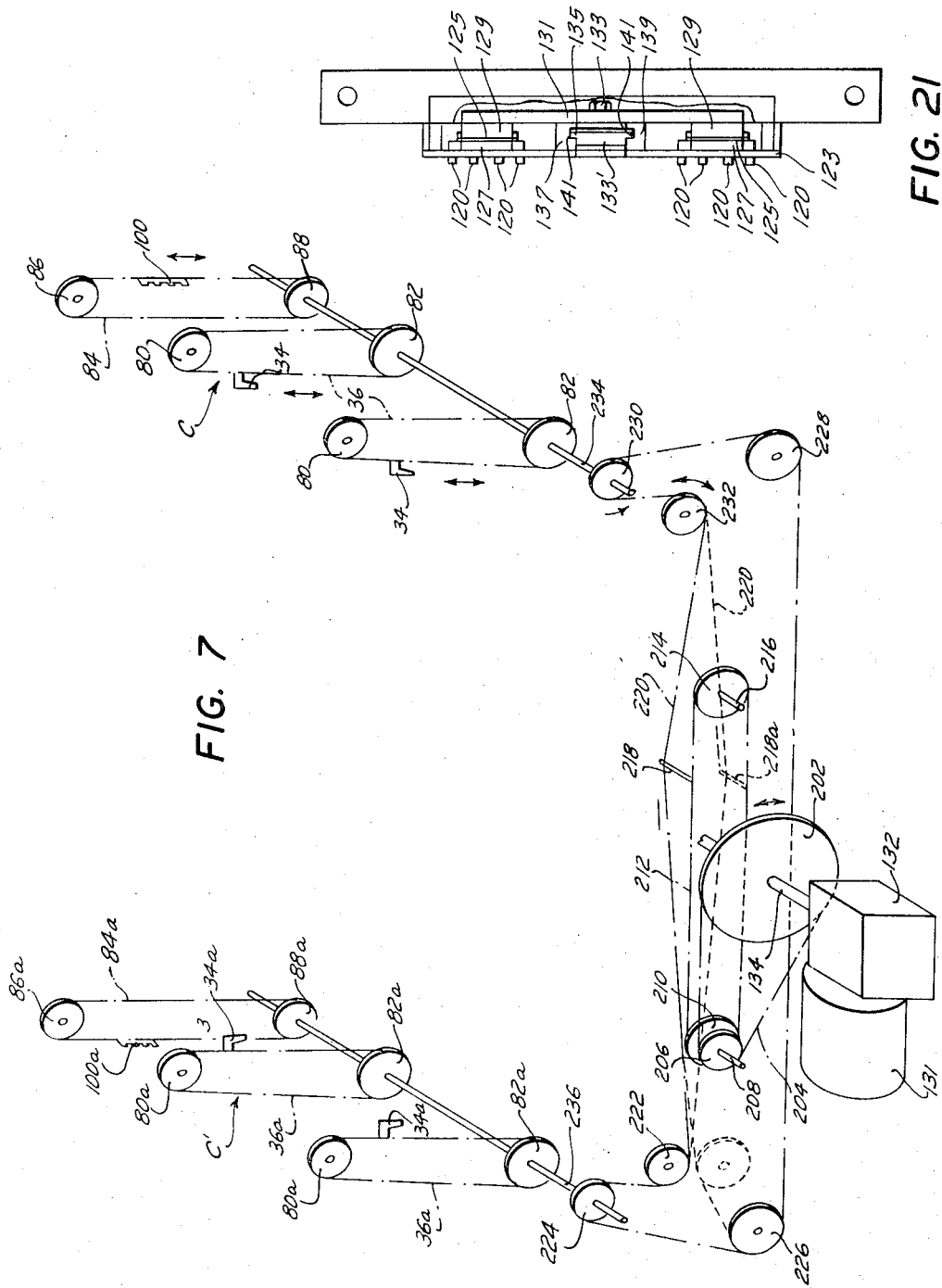
FIG. 7 is a schematic diagram of the mechanism provided for reciprocating the conveyor and control chains and showing the feed lugs and the template carried by those chains.

As seen in FIG. 7, shaft 134 also carries a sprocket wheel 202 about which a chain 204 passes, chain 204 also passing over a smaller diameter sprocket wheel 206 fast on shaft 208. Also mounted on shaft 208 is a sprocket wheel 210 about which an endless chain 212 passes, that chain also passing over a second sprocket wheel 214 mounted on shaft 216. One end of a rod 218 is secured to chain 212. Its other end is also secured to a chain 220, chain 220 passing over sprocket wheels 222, 224, 226, 228, 230 and 232. Sprocket wheel 230 is fast on shaft 234 which also carries sprocket wheels 82 and 88 of the chain system associated with conveyor station C and sprocket wheel 224 is fast on shaft 236 which carries the lower sprocket wheels 82a and 88a of the chain system associated with conveyor station C'. Thus, rotation of sprocket wheel 230 causes movement of chains 36 and 84 and the rotation of sprocket wheel 224 causes the movement of chains 36a and 84a.

In operation, the rotation of shaft 134 in a counterclockwise direction causes wheel 202, and chains 204 and 212 to rotate in a counterclockwise direction and causes rod 218 and chain 220 to move laterally towards the left (as viewed in FIG. 7). That movement of chain 220 imparts a clockwise rotation to sprocket wheel 232 and a counterclockwise rotation of sprocket wheel 230. The latter rotation in turn causes a counterclockwise rotation of shaft 234 and thus of sprocket wheels 82 and 88 which will in turn cause feed lugs 34 to move in a downward direction and cause template 100 to move in an upward direction. In a similar manner, sprocket wheel 222 will be caused to rotate in a clockwise direction causing a counterclockwise rotation of sprocket wheel 224 and shaft 236, which in turn will cause the feed lugs 36a to move in an upward direction and the template 100a to move in a downward direction.

When rod 218 has passed around the sprocket wheel 210, and is then moving towards the right, along the lower flight of its path towards sprocket wheel 214, as shown by dotted rod 218a in FIG. 7, the direction of movement of rod 218 is reversed, and the movements of chain 220, feed lugs 34, 34a, and templates 100, 100a are respectively reversed. Thus it will be seen that the operation of the chain drive mechanism imparts vertical reciprocatory movement in opposite directions to the feed lugs 34 (and 34a) and templates 100 (and 100a) of the two chain drive systems, these chain systems thus operating essentially 180° out of phase with one another. As the chain systems are both operatively driven by the common shaft 134, which also drives the sucker assemblies B and B' and the ram 39, the movements of all mechanisms involved in moving and forming the blank in each box forming section are positively synchronized, and the desired 180° displacement of blank forming operations in each of the forming sections is achieved.

SUMMARY OF OPERATION

The sucker assembly (B or B') is first moved towards the blank by means of the sucker operating mechanism (72 or 72') and when the sucker arms 70 reach the leading blank in the stack, the proper solenoid switch (192 or 194) is actuated and vacuum pressure is applied to the end of sucker arms 70 in the appropriate sucker assembly to grasp a blank from the appropriate stack. The direction of movement of sucker arms is then reversed and the sucker arms, still grasping the leading blank, are moved towards the conveying station C or C' during which time the corner flaps of the blanks are folded. When the blank arrives at the conveying station the vacuum pressure is removed from the sucker arms, and the feed lugs are moved downward further to engage the upper edges of the end panels of the blank and to move the blank downwards to the mouth of the forming die (38 or 38'). During this movement glue is applied to the blank. The ram 39 is then reciprocated to engage that blank and insert it into the forming die, thereby to fold the side and end panels of the blank into their condition to form the finished box. While this is occuring, the sucker moving mechanism and chain drive of the other box forming station are operating in the reverse direction, that is, the feed lugs are moving upwards away from the forming die back towards the upper end of the conveyor station, the sucker arms are now beginning to move outward towards the other stack to engage a new blank from that stack, and the direction of the ram is away from the other forming die to withdraw the other forming head from that forming die. Further rotation of shaft 134 is then effective to once again reverse the operation of the various sucker, chain and ram mechanisms, to bring about blank positioning and box forming at the other section of the machine, while the section of the machine at which the box was just formed is being readied for a new box forming operation.

The present invention has thus provided a box forming machine which forms finished boxes at two opposed box forming stations utilizing a single ram having forming heads at both of its ends. The insertion of the ram into one of the forming dies pushes a blank in that die to form the box and the withdrawal of the ram from that die is effective to push a blank into the other of the forming dies to form a box thereat. As a result, both the speed and efficiency of the box forming operation are increased. The blank is conveyed to the mouth of the forming die in precise registration with the opening of the die to assure that the folding operation will be performed along the desired fold lines so that a neat box will be consistently formed by the machine. As ram movement and blank insertion are effected horizontally, the operation of the machine is relatively quiet and free from vibration. The various loading and forming elements in the machine may be readily adjusted to accomodate blanks of different sizes and folding configurations to increase the flexibility of the machine in forming boxes of correspondingly different sizes and shapes. Moreover, the loading of the blanks in the machine is facilitated, and provides means for detecting the presence of miscut or improperly dimensioned or oriented blanks which can be quickly rejected at the loading station, thus avoiding the wasteful effort involved in the manufacture of boxes which will have to be subsequently rejected. As a result a properly and neatly formed and glued box is insured at both the forming dies with a minimum amount of supervision and adjustment to the machine elements. The machine forms boxes and trays from blanks in a more efficient and economical manner than was heretofore possible in machines of this type.

While one major advantage of the machine here described is its double-ended action, that is not its only advantage, and it will be appreciated that where a high rate of productivity is not a factor only one set of loading station, conveyor station and forming die can be provided, such a single-ended machine still exhibiting others of the advantages of the disclosed mechanisms.

While only a single embodiment of this invention has been herein specifically disclosed, it will be apparent that variations may be made thereto without departing from the spirit and scope of the invention as defined in the following claims:

I claim:

1. A machine for forming a box from a blank having a pair of transverse slots of a given height formed along opposite edges thereof, said machine comprising a loading station at which a stack of said blanks is to be initially disposed, said loading station comprising a pair of rails one of said rails located on one side of the stack and the other rail located on the opposite side of the stack, said rails adapted to extend widthwise substantially horizontally into a slot on the respective side thereof and being effective when so extended to support the blank in a substantially vertical orientation, and a substantially vertically enlarged part having a height less than said given height carried by said rail adjacent its end and adapted to engage the wall of the leading blank in the stack adjacent said slot, thereby to limit movement of the stack of blanks along said rail.

2. The box forming machine in claim 1, in which an additional slot spaced from one of said first pair of slots is formed in one edge of said blank, said loading station further comprising a member located below said enlarged part and adapted to engage the leading blank adjacent said additional slot, thereby to provide means effective to limit movement of the stack of blanks from its vertical orientation.

3. The box forming machine of claim 1, in which said loading station further comprises plate means defining a reference level upon which said blanks are adapted to be initially positioned before engagement of said rail with said slot, and means for varying the distance between said plate means and said rail to accommodate only blanks having a predetermined spacing between its bottom edge and the slot receiving said rail.

* * * * *